(12) United States Patent
Zhang et al.

(10) Patent No.: US 8,428,115 B2
(45) Date of Patent: Apr. 23, 2013

(54) ADAPTIVE EQUALIZATION SYSTEM AND METHOD

(75) Inventors: Ziche Zhang, Chengdu (CN); Guosheng Wu, Chengdu (CN)

(73) Assignee: IPGoal Microelectronics (SiChuan) Co., Ltd., Chengdu, Sichuan Province (CN)

( * ) Notice: Subject to any disclaimer, the term of this patent is extended or adjusted under 35 U.S.C. 154(b) by 56 days.

(21) Appl. No.: 13/196,152

(22) Filed: Aug. 2, 2011

(65) Prior Publication Data

US 2012/0039381 A1 Feb. 16, 2012

(30) Foreign Application Priority Data

Aug. 12, 2010 (CN) .......................... 2010 1 0251830

(51) Int. Cl.
*H03H 7/30* (2006.01)
*H03H 7/40* (2006.01)
*H03K 5/159* (2006.01)
(52) U.S. Cl.
USPC .......................... 375/232; 333/28 R; 708/323
(58) Field of Classification Search .................. 375/229, 375/232, 350; 333/28 R, 166; 708/300, 708/322, 323
See application file for complete search history.

(56) References Cited

U.S. PATENT DOCUMENTS

| 8,063,807 | B1 * | 11/2011 | Lai et al. ........................ 341/144 |
| 8,175,143 | B1 * | 5/2012 | Wong et al. .................... 375/232 |
| 2004/0190661 | A1 * | 9/2004 | Vrazel ........................... 375/350 |
| 2011/0032978 | A1 * | 2/2011 | Lin et al. ....................... 375/232 |

* cited by examiner

*Primary Examiner* — Jean B Corrielus

(57) ABSTRACT

An adaptive equalization system includes an equalizer, a common-mode extraction buffer unit, a low-pass filter unit, a first and second energy compare units, a current comparator, and a digital control unit. The common-mode extraction buffer unit transmits a full spectral energy of an input signal received by the equalizer to the first energy compare unit and the low-pass filter unit, and extracts a common-mode signal of the input signal to the second energy compare unit. The first and second energy compare units respectively output a current signal characterized by the high-frequency energy and a current signal characterized by the low-frequency energy to the current comparator. Based on the compare result outputted by the current comparator, the digital control unit outputs an equalization control signal to the equalizer. The adaptive equalization system has the simple structure, and reduces the power consumption, the area and the manufacturing cost of the chip.

19 Claims, 4 Drawing Sheets

ADAPTIVE EQUALIZATION SYSTEM AND METHOD

BACKGROUND OF THE PRESENT INVENTION

1. Field of Invention

The present invention relates to a signal processing system and method, and more particularly to an adaptive equalization system and method with the simple structure.

2. Description of Related Arts

In the high-speed signal transmission system, after the long distance transmission, the signal will be attenuated, thus the receiver of the system receives the distortion signal.

To compensate the loss of the spectral component of the signal on the transmission medium in the high-speed signal transmission system, it is always needed that the equalizer is used in the receiver of the system to make the equalization treatment to the received input signal to obtain the signal with the smaller distortion.

Fixed parameter equalizer and adaptive parameter equalizer are two kinds of existing equalizers. The fixed parameter equalizer has simple structure and facilitates the manufacture. However, with the change of the manufacturing process and that of the channel itself, the larger error will be generated. If a same parameter is always used, the equalization effect is not the best, and even the extra jitter is introduced, thus the quality is deteriorated. For the adaptive parameter equalizer, the parameter of the equalizer is adaptive to the change of the manufacturing process and the channel itself, so that the signal is perfectly compensated. However, the traditional adaptive parameter equalizer has the complex structure, so the power consumption, the area and the manufacturing cost of the chip are increased.

SUMMARY OF THE PRESENT INVENTION

An object of the present invention is to provide an adaptive equalization system and method which has the simple structure.

Accordingly, in order to accomplish the above object, the present invention provides an adaptive equalization system, comprising:

an equalizer, a common-mode extraction buffer unit connected with the equalizer, a low-pass filter unit connected with the common-mode extraction buffer unit, a first energy compare unit connected with the low-pass filter unit, a second energy compare unit connected with the low-pass filter unit, a current compare unit connected with the first and second energy compare units, and a digital control unit connected with the current comparator and the equalizer, wherein the common-mode extraction buffer unit transmits a full spectral energy of an input signal outputted by the equalizer to the first energy compare unit and the low-pass filter unit, and extracts a common-mode signal of the input signal to the second energy compare unit, the first energy compare unit outputs a current signal characterized by a high-frequency energy to the current comparator, the second energy compare unit outputs a current signal characterized by a low-frequency energy to the current comparator, the digital control unit outputs an equalization control signal for controlling a grade of the equalizer to the equalizer based on a compare result outputted by the current comparator.

Also, the present invention provides an adaptive equalization method, comprising the steps of:

(A) amplifying and filtering an input signal by an equalizer, and transmitting the amplified and filtered signal to a common-mode extraction buffer unit;

(B) outputting a full spectral energy of the input signal to a low-pass filter unit and extracting a common-mode signal of the input signal to a second energy compare unit by the common-mode extraction buffer unit;

(C) outputting a low spectral energy of the input signal to a first energy compare unit and the second energy compare unit by the low-pass filter unit;

(D) outputting a current signal characterized by a high-frequency energy to a current comparator by the first energy compare unit, and outputting a current signal characterized by a low-frequency energy to the current comparator by the second energy compare unit; and (E) comparing the current signal characterized by the high-frequency energy with the current signal characterized by the low-frequency energy and transmitting a compare result to a digital control unit by the current comparator, and based on the compare result, outputting an equalization control signal for controlling a grade of the equalizer to the equalizer by the digital control unit.

Compared with the prior art, the adaptive equalization system and method of the present invention can automatically compensate the loss of the spectral component of the signal on the transmission medium in the high-speed signal transmission system. It has the simple structure, and reduces the power consumption, the area and the manufacturing cost of the chip.

These and other objectives, features, and advantages of the present invention will become apparent from the following detailed description, the accompanying drawings, and the appended claims.

DETAILED DESCRIPTION OF THE PREFERRED EMBODIMENT

Figure 1:
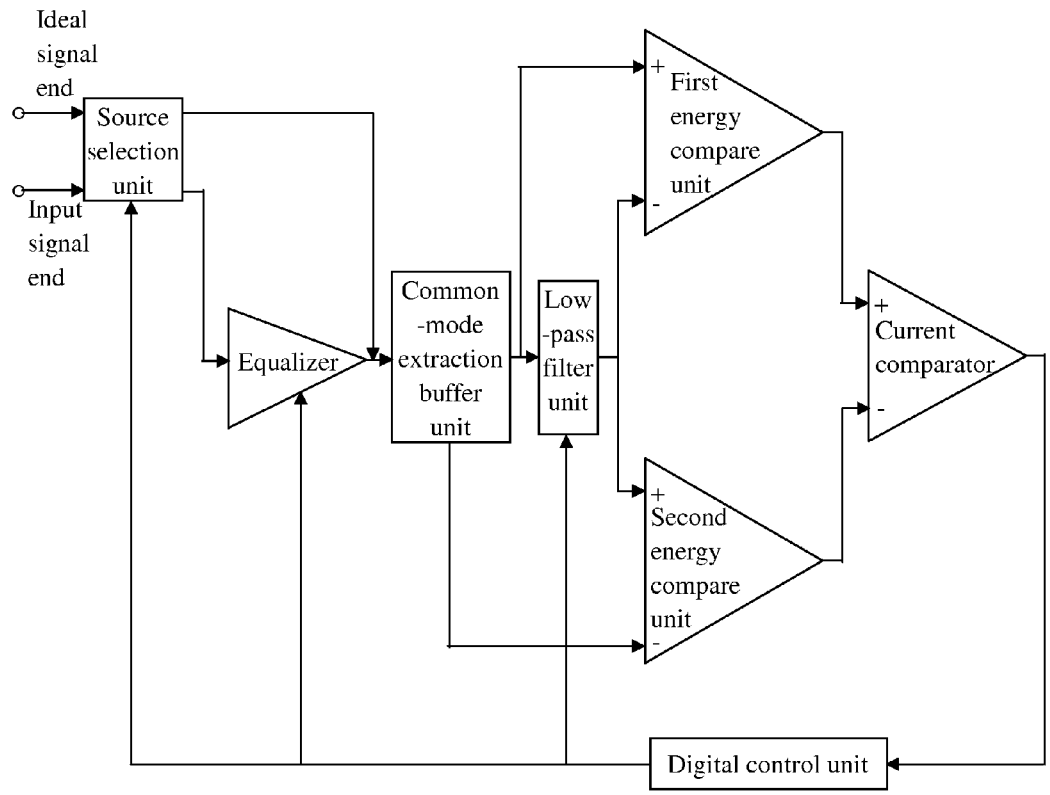
FIG. 1 is a system block diagram of an adaptive equalization system according to a preferred embodiment of the present invention.

Referring to FIG. 1 of the drawings, an adaptive equalization system according to a preferred embodiment of the present invention is illustrated, wherein the adaptive equalization system comprises a source selection unit, an equalizer connected with the source selection unit, a common-mode extraction buffer unit connected with the equalizer, a low-pass filter unit connected with the common-mode extraction buffer unit, a first energy compare unit connected with the low-pass filter unit, a second energy compare unit connected with the low-pass filter unit, a current comparator connected with the first and second energy compare units, and a digital control unit connected with the current comparator.

A first input end of the source selection unit is connected with an ideal signal end, a second input end thereof is connected with an input signal end, a first output end thereof is connected with an input end of the common-mode extraction buffer unit, and a second output end thereof is connected with an input end of the equalizer. An output end of the equalizer is connected with the input end of the common-mode extraction buffer unit. A first output end of the common-mode extraction buffer unit and an input end of the low-pass filter unit are connected with a positive input end of the first energy compare unit, and a second output end of the common-mode extraction buffer unit is connected with a negative input end of the second energy compare unit. An output end of the low-pass filter unit is connected with a negative input end of the first energy compare unit and a positive input end of the second energy compare unit. An output end of the first energy compare unit is connected with a positive input end of the current comparator. An output end of the second energy compare unit is connected with a negative input end of the current comparator. An output end of the current comparator is connected with an input end of the digital control unit. An output end of the digital control unit is connected with the source selection unit, the equalizer and the low-pass filter unit.

Based on the signal outputted by the digital control unit, the source selection unit switches the signals respectively inputted from the ideal signal end and the input signal end. When the signal is inputted into the ideal signal end, the source selection unit directly transmits the signal inputted into the ideal signal end to the common-mode extraction buffer unit. When the signal is inputted into the input signal end, the source selection unit transmits the signal inputted into the input signal end to the equalizer.

Based on the signal outputted by the digital control unit, the equalizer adjusts the distortion signal from the input signal end to compensate the loss of the spectral component of the signal on the transmission medium. The common-mode extraction buffer unit is adapted for generating the full spectral energy of the input signal, transmitting the full spectral energy of the input signal to the low-pass filter unit and the positive input end of the first energy compare unit, and extracting a common-mode signal to the negative input end of the second energy compare unit. The low-pass filter unit is adapted for filtering the received high spectral energy, and transmitting the low spectral energy to the negative input end of the first energy compare unit and the positive input end of the second energy compare unit. The first energy compare unit compares the inputted signal energy and outputs a current signal characterized by the high-frequency energy to the positive input end of the current comparator. The second energy compare unit compares the inputted signal energy and outputs a current signal characterized by the low-frequency energy to the negative input end of the current comparator. The current comparator compares the inputted current signals and outputs a signal to the digital control unit. The digital control unit outputs a selection signal for switching the system working mode to the signal selection unit, an equalization control signal for controlling the grade of the equalizer to the equalizer, and an initialization control signal for controlling the bandwidth of the low-pass filter unit to the low-pass filter unit.

The adaptive equalization system of the present invention begins to work after receiving a reset signal. Firstly, the system enters into the initialization working state by the digital control unit via the source selection unit. After the successful initialization, the system is switched to the normal working state by the digital control unit via the source selection unit.

Figure 2:
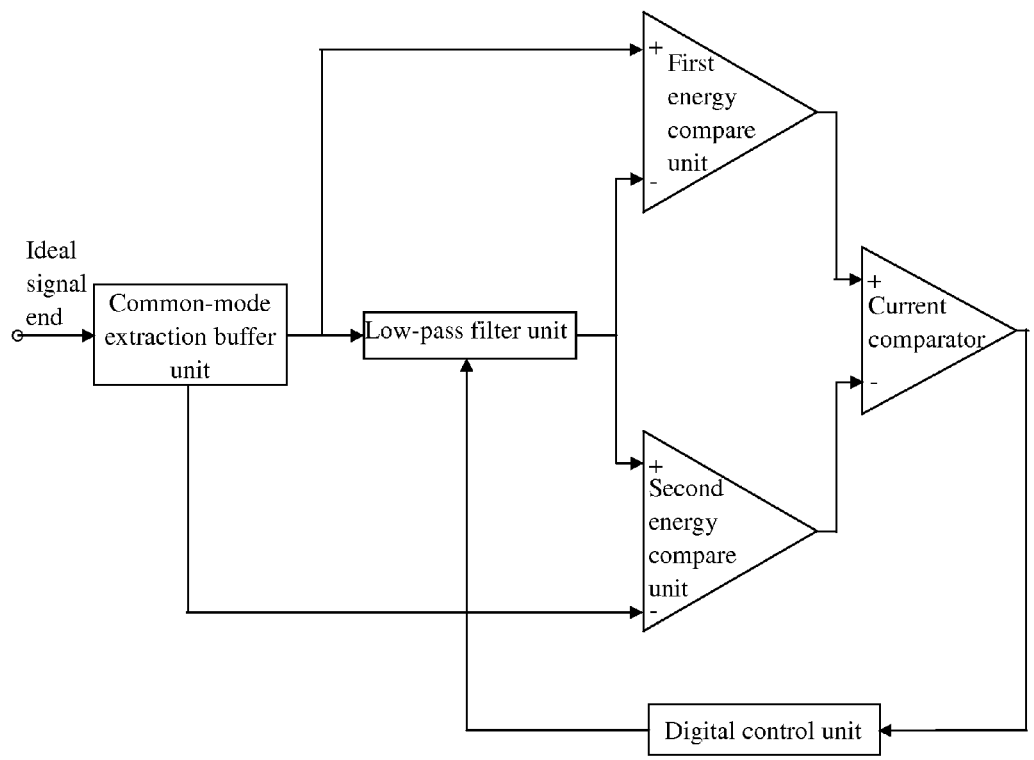
FIG. 2 is a system block diagram of the adaptive equalization system at an initialization working state according to the above preferred embodiment of the present invention.

FIG. 2 is a system block diagram of the adaptive equalization system at the initialization working state according to the preferred embodiment of the present invention. After the adaptive equalization system receives the reset signal, the digital control unit outputs a first selection signal to the source selection unit such that an ideal signal with the ideal waveform is inputted from the ideal signal end to the common-mode extraction buffer unit. The common-mode extraction buffer unit outputs the full spectral energy of the ideal signal to the low-pass filter unit, and extracts the common-mode signal to the negative input end of the second energy compare unit. The low-pass filter unit outputs the low spectral energy to the negative input end of the first energy compare unit and the positive input end of the second energy compare unit. The first energy compare unit outputs the current signal characterized by the high-frequency energy to the positive input end of the current comparator. The second energy compare unit outputs the current signal characterized by the low-frequency energy to the negative input end of the current comparator. The current comparator compares the two current signals, and transmits the compare result to the digital control unit. The digital control unit generates the initialization control signal for controlling the bandwidth of the low-pass filter unit till the current inputted at the positive input end is equal to the current inputted at the negative input end of the current comparator, that is to say, when the high-frequency energy of the signal is equal to the low-frequency energy of the signal, the initialization configure of the low-pass filter unit is completed, the state at this point is locked up and the system enters into the normal working state.

Figure 3:
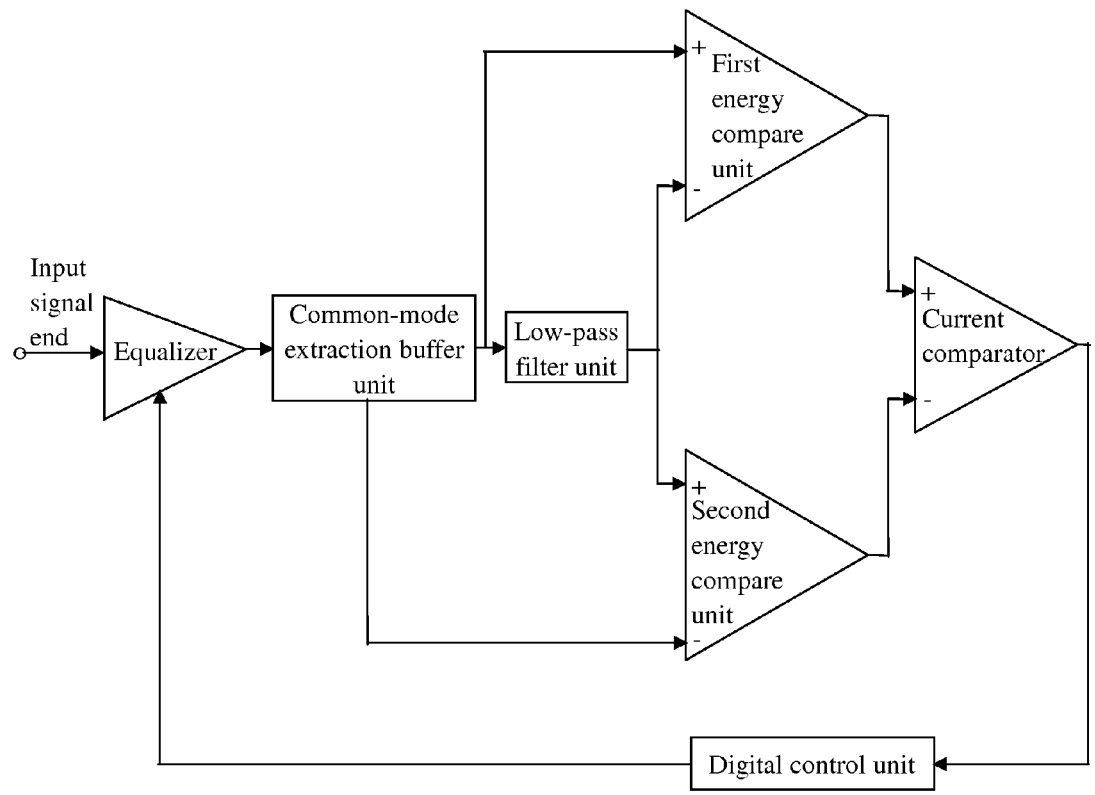
FIG. 3 is a system block diagram of the adaptive equalization system at a normal working state according to the above preferred embodiment of the present invention.

FIG. 3 is a system block diagram of the adaptive equalization system at the normal working state according to the preferred embodiment of the present invention. After the initialization is completed, the digital control unit outputs a second selection signal to the source selection unit, such that a distortion signal distorting after the long distance transmission is inputted from the input signal end to the equalizer. The equalizer amplifies and filters the distortion signal, and transmits the amplified and filtered signal to the common-mode extraction buffer unit. The common-mode extraction buffer unit outputs the full spectral energy of the distortion signal to the low-pass filter unit, and extracts a common-mode signal to the negative input end of the second energy compare unit. The low-pass filter unit outputs the low spectral energy to the negative input end of the first energy compare unit and the positive input end of the second energy compare unit. The first energy compare unit outputs the current signal characterized by the high spectral energy to the positive input end of the current comparator. The second energy compare unit outputs the current signal characterized by the low spectral energy to the negative input end of the current comparator. The current comparator compares the two current signals, and transmits the compare result to the digital control unit. The digital control unit outputs the equalization control signal for controlling the grade of the equalizer to the equalizer. The high spectral energy is equal to the low spectral energy of the signal by adjusting the equalizer, so that the distortion signal is well recovered, the configuration of the equalizer is completed. The configuration state of the equalizer is locked up thereafter, the system is at the normal state.

In another preferred embodiment of the present invention, the ideal signal and the inputted distortion signal can be directly outputted to the common-mode extraction buffer unit by the equalizer, that is to say, after the adaptive equalization system receives the reset signal, an ideal signal with the ideal waveform is inputted from the ideal signal end to the common-mode extraction buffer unit through the equalizer. After the initialization is completed, the distortion signal distorting after the long distance transmission is inputted from the input signal end to the equalizer. The equalizer amplifies and filters the distortion signal, and transmits the amplified and filtered signal to the common-mode extraction buffer unit.

Figure 4:
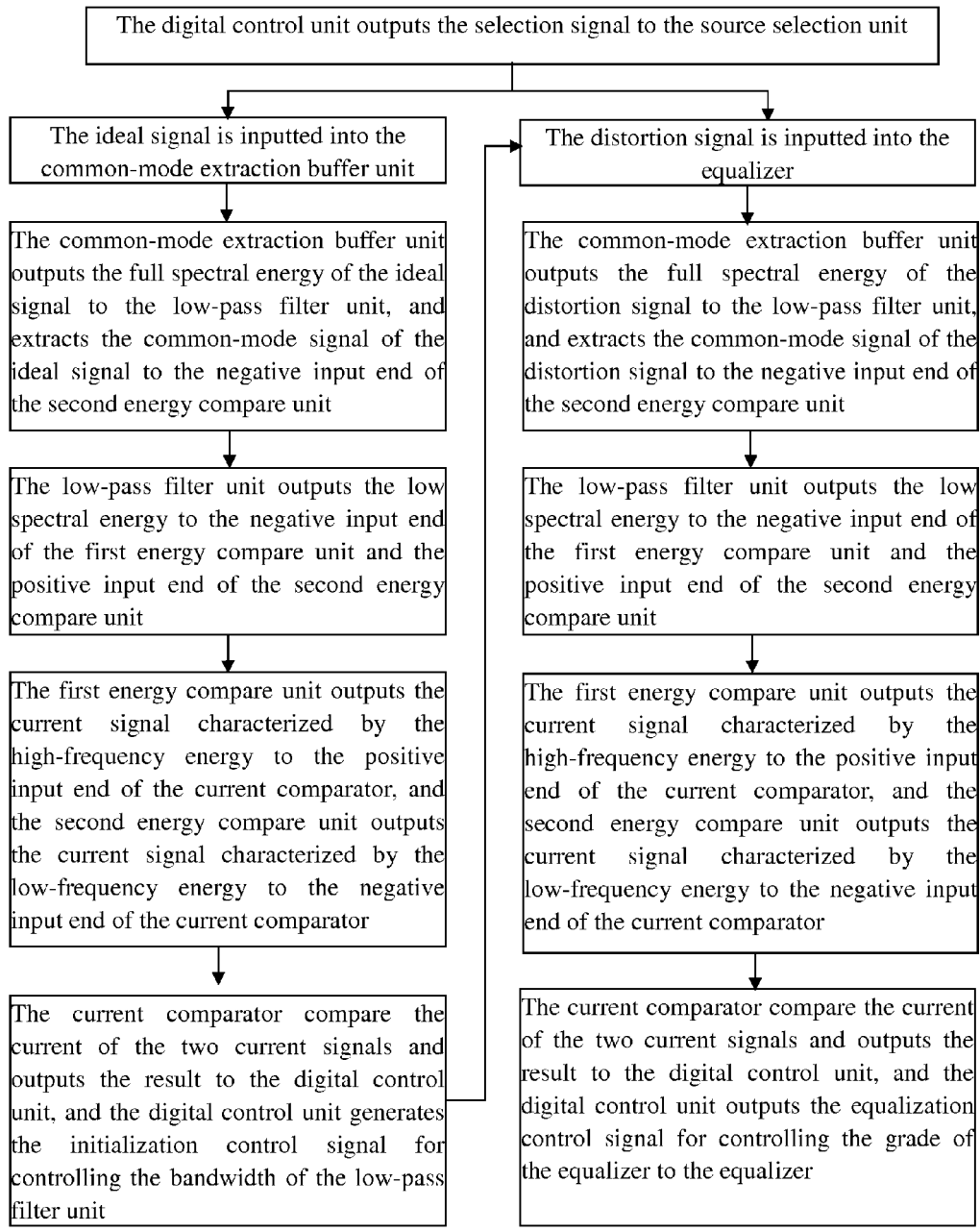
FIG. 4 is a flow chart of an adaptive equalization method according to a preferred embodiment of the present invention.

Referring to FIG. 4, an adaptive equalization method according to a preferred embodiment of the present invention comprises the steps as follows.

(1) The digital control unit outputs a selection signal to the source selection unit. When the digital control unit outputs the first selection signal to the source selection unit, the system enters into the initialization configuration of step (2). When the digital control unit outputs the second selection signal to the source selection unit, the system directly enters into the normal mode of step (7).

(2) An ideal signal with an ideal waveform is inputted from the ideal signal end to the common-mode extraction buffer unit.

(3) The common-mode extraction buffer unit outputs the full spectral energy of the ideal signal to the low-pass filter unit, and extracts the common-mode signal of the ideal signal to the negative input end of the second energy compare unit.

(4) The low-pass filter unit outputs the low spectral to the negative input end of the first energy compare unit and the positive input end of the second energy compare unit.

(5) The first energy compare unit outputs a current signal characterized by the high spectral energy to the positive input end of the current comparator, and the second energy compare unit outputs a current signal characterized by the low spectral energy to the negative input end of the current comparator.

(6) The current comparator compares the two current signals and transmits the compare result to the digital control unit. The digital control unit generates the initialization control signal for controlling the bandwidth of the low-pass filter unit till the current inputted at the positive input end is equal to the current inputted at the negative input end of the current comparator, that is to say, when the high spectral energy of the signal is equal to the low spectral energy of the signal, the initialization configuration of the low-pass filter unit is completed, the state at this point is locked up, and the system enters into the normal working state.

(7) The distortion signal distorting after the long distance transmission is inputted from the input signal end to the equalizer. The equalizer amplifies and filters the distortion signal, and transmits the amplified and filtered signal to the common-mode extraction buffer unit.

(8) The common-mode extraction buffer unit outputs the full spectral energy of the distortion signal to the low-pass filter unit, and extracts the common-mode to the negative input end of the second energy compare unit.

(9) The low-pass filter unit outputs the low spectral energy to the negative input end of the first energy compare unit and the positive input end of the second energy compare unit.

(10) The first energy compare unit outputs the current signal characterized by the high spectral energy to the positive input end of the current comparator. The second energy compare unit outputs the current signal characterized by the low spectral energy to the negative input end of the current comparator.

(11) The current comparator compares the two current signals and transmits the compare result to the digital control unit. The digital control unit outputs the equalization control signal for controlling the grade of the equalizer to the equalizer. The high spectral energy is equal to the low spectral energy of the signal by adjusting the equalizer, so that the distortion signal is well recovered, the configuration of the equalizer is completed. The configuration state of the equalizer is locked up thereafter, and the system works at the normal state.

The adaptive equalization system and method of the present invention can automatically compensate the loss of the spectral component of the signal on the transmission medium in the high-speed signal transmission system. It has the simple structure and reduces the power consumption, the area and the manufacturing cost of the chip.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An adaptive equalization system, comprising:
an equalizer, a common-mode extraction buffer unit connected with said equalizer, a low-pass filter unit connected with said common-mode extraction buffer unit, a first energy compare unit connected with said low-pass filter unit, a second energy compare unit connected with said low-pass filter unit, a current comparator connected with said first and second energy compare units, and a digital control unit connected with said current comparator,
wherein said common-mode extraction buffer unit transmits a full spectral energy of an input signal received by said equalizer to said first energy compare unit and said low-pass filter unit, and extracts a common-mode signal of said input signal to said second energy compare unit, said first energy compare unit outputs a current signal characterized by a high-frequency energy to said current comparator, said second energy compare unit outputs a current signal characterized by a low-frequency energy to said current comparator, said digital control unit outputs an equalization control signal for controlling a grade of said equalizer to said equalizer based on a compare result outputted by said current comparator.

2. The adaptive equalization system, as recited in claim 1, wherein said common-mode extraction buffer unit transmits said full spectral energy of said input signal received by said equalizer to said low-pass filter unit and a positive input end of said first energy compare unit, said low-pass filter unit filters a high spectral energy and transmits a low spectral energy to a negative input end of said first energy compare unit and a positive input end of said second energy compare unit, said common-mode extraction buffer extracts a common-mode signal of said input signal to a negative input end of said second energy compare unit.

3. The adaptive equalization system, as recited in claim 2, wherein said first energy compare unit outputs said current signal characterized by said high-frequency energy to a positive input end of said current comparator, said second energy compare unit outputs said current signal characterized by said low-frequency energy to a negative input end of said current comparator.

4. An adaptive equalization system, comprising:
a source selection unit, an equalizer connected with said source selection unit, a common-mode extraction buffer unit connected with said equalizer, a low-pass filter unit connected with said common-mode extraction buffer unit, a first energy compare unit connected with said low-pass filter unit, a second energy compare unit connected with said low-pass filter unit, a current comparator connected with said first and second energy compare units, and a digital control unit connected with said current comparator, wherein a first input end of said source selection unit is connected with an ideal signal end, a second input end thereof is connected with an input signal end, a first output end thereof is connected with an input end of said common-mode extraction buffer unit, a second output end thereof is connected with an input end of said equalizer, an output end of said equalizer is connected with said input end of said common-mode extraction buffer unit, a first output end of said common-mode extraction buffer unit and an input end of said low-pass filter unit are connected with a positive input end of said first energy compare unit, a second output end of said common-mode extraction buffer unit is connected with a negative input end of said second energy compare unit, an output end of said low-pass filter unit is connected with a negative input end of said first energy compare unit and a positive input end of said second energy compare unit, an output end of said first energy compare unit is connected with a positive input end of said current comparator, an output end of said second energy compare unit is connected with a negative input end of said current comparator, an output end of said current comparator is connected with an input end of said digital control unit, an output end of said digital control unit is connected with said source selection unit, said equalizer and said low-pass filter unit.

5. An adaptive equalization method, comprising the steps of:
(A) amplifying and filtering an input signal by an equalizer, and transmitting the amplified and filtered signal to a common-mode extraction buffer unit;
(B) outputting a full spectral energy of the input signal to a low-pass filter unit and a first energy compare unit, and extracting a common-mode signal of the input signal to a second energy compare unit by the common-mode extraction buffer unit;
(C) outputting a low spectral energy of the input signal to the first energy compare unit and the second energy compare unit by the low-pass filter unit;
(D) outputting a current signal characterized by a high-frequency energy to a current comparator by the first energy compare unit, and outputting a current signal characterized by a low-frequency energy to the current comparator by the second energy compare unit; and
(E) comparing the current signal characterized by the high-frequency energy with the current signal characterized by the low-frequency energy and transmitting a compare result to a digital control unit by the current comparator, and based on the compare result, outputting an equalization control signal for controlling a grade of the equalizer to the equalizer by the digital control unit.

6. The adaptive equalization method, as recited in claim 5, wherein the common-mode extraction buffer unit transmits the full spectral energy of the input signal to the low-pass filter unit and a positive input end of the first energy compare unit, the low-pass filter unit transmits the low spectral energy to a negative input end of the first energy compare unit and a positive input end of the second energy compare unit, the common-mode extraction buffer extracts the common-mode signal of the input signal to a negative input end of the second energy compare unit.

7. The adaptive equalization method, as recited in claim 6, wherein the first energy compare unit outputs the current signal characterized by the high-frequency energy to a positive input end of the current comparator, the second energy compare unit outputs the current signal characterized by the low-frequency energy to a negative input end of the current comparator.

8. The adaptive equalization method, as recited in claim 5, further comprising the step of outputting a selection signal to a source selection unit by the digital control unit, wherein an ideal signal with a ideal waveform is inputted into a first input end of the source selection unit, and the input signal is inputted into a second input end of the source selection unit, wherein the input signal is a distortion signal distorting after a long distance transmission.

9. The adaptive equalization method, as recited in claim 6, further comprising the step of outputting a selection signal to a source selection unit by the digital control unit, wherein an ideal signal with a ideal waveform is inputted into a first input end of the source selection unit, and the input signal is inputted into a second input end of the source selection unit, wherein the input signal is a distortion signal distorting after a long distance transmission.

10. The adaptive equalization method, as recited in claim 7, further comprising the step of outputting a selection signal to a source selection unit by the digital control unit, wherein an ideal signal with a ideal waveform is inputted into a first input end of the source selection unit, and the input signal is inputted into a second input end of the source selection unit, wherein the input signal is a distortion signal distorting after a long distance transmission.

11. The adaptive equalization method, as recited in claim 8, wherein based on the selection signal outputted by the digital control unit, the source selection unit switches the ideal signal and the input signal, wherein when the ideal signal is inputted into the source selection unit, the source selection unit directly transmits the ideal signal to the common-mode extraction buffer unit, when the input signal is inputted into the source selection unit, the source selection unit transmits the input signal to the equalizer.

12. The adaptive equalization method, as recited in claim 9, wherein based on the selection signal outputted by the digital control unit, the source selection unit switches the ideal signal and the input signal, wherein when the ideal signal is inputted into the source selection unit, the source selection unit directly transmits the ideal signal to the common-mode extraction buffer unit, when the input signal is inputted into the source selection unit, the source selection unit transmits the input signal to the equalizer.

13. The adaptive equalization method, as recited in claim 10, wherein based on the selection signal outputted by the digital control unit, the source selection unit switches the ideal signal and the input signal, wherein when the ideal signal is inputted into the source selection unit, the source selection unit directly transmits the ideal signal to the common-mode extraction buffer unit, when the input signal is inputted into the source selection unit, the source selection unit transmits the input signal to the equalizer.

14. The adaptive equalization method, as recited in claim 11, wherein when the digital control unit outputs a first selection signal to the source selection unit, the ideal signal is inputted into the common-mode buffer unit, the common-mode buffer unit generates a full spectral energy of the ideal signal and extracts a common-mode signal of the ideal signal, the digital control unit generates an initialization control signal for controlling a bandwidth of the low-pass filter unit till a high-frequency energy of the ideal signal is equal to a low-frequency energy of the ideal signal, so that an initialization configuration of the low-pass filter unit is completed.

15. The adaptive equalization method, as recited in claim 12, wherein based on the selection signal outputted by the digital control unit, the source selection unit switches the ideal signal and the input signal, wherein when the ideal signal is inputted into the source selection unit, the source selection unit directly transmits the ideal signal to the common-mode extraction buffer unit, when the input signal is inputted into the source selection unit, the source selection unit transmits the input signal to the equalizer.

16. The adaptive equalization method, as recited in claim 13, wherein based on the selection signal outputted by the digital control unit, the source selection unit switches the ideal signal and the input signal, wherein when the ideal signal is inputted into the source selection unit, the source selection unit directly transmits the ideal signal to the common-mode extraction buffer unit, when the input signal is inputted into the source selection unit, the source selection unit transmits the input signal to the equalizer.

17. The adaptive equalization method, as recited in claim 14, wherein after the initialization configuration of the low-pass filter unit, the digital control unit outputs a second selection signal to the source selection unit, the input signal is inputted into the equalizer, the high-frequency energy of the input signal is equal to the low-frequency energy of the input signal by adjusting the equalizer via the digital control unit.

18. The adaptive equalization method, as recited in claim 15, wherein after the initialization configuration of the low-pass filter unit, the digital control unit outputs a second selection signal to the source selection unit, the input signal is inputted into the equalizer, the high-frequency energy of the input signal is equal to the low-frequency energy of the input signal by adjusting the equalizer via the digital control unit.

19. The adaptive equalization method, as recited in claim 16, wherein after the initialization configuration of the low-pass filter unit, the digital control unit outputs a second selection signal to the source selection unit, the input signal is inputted into the equalizer, the high-frequency energy of the input signal is equal to the low-frequency energy of the input signal by adjusting the equalizer via the digital control unit.

* * * * *